United States Patent [19]
Radigan

[11] Patent Number: 6,016,398
[45] Date of Patent: Jan. 18, 2000

[54] METHOD FOR USING STATIC SINGLE ASSIGNMENT TO COLOR OUT ARTIFICIAL REGISTER DEPENDENCIES

[75] Inventor: Jim J. Radigan, San Jose, Calif.

[73] Assignee: Intel Corporation, Santa Clara, Calif.

[21] Appl. No.: 08/831,739

[22] Filed: Apr. 1, 1997

[51] Int. Cl.⁷ .................................................. G06F 9/45
[52] U.S. Cl. ............................................................. 395/709
[58] Field of Search ..................................... 395/707, 709

[56] References Cited

U.S. PATENT DOCUMENTS

| | | | |
|---|---|---|---|
| 4,782,444 | 11/1988 | Munshi et al. | 395/209 |
| 5,175,856 | 12/1992 | Van Dyke et al. | 395/704 |
| 5,249,295 | 9/1993 | Briggs | 395/709 |
| 5,659,754 | 8/1997 | Grove et al. | 395/709 |
| 5,701,489 | 12/1997 | Bates et al. | 395/709 |
| 5,768,595 | 6/1998 | Gillies | 395/709 |
| 5,768,596 | 6/1998 | Chow et al. | 395/709 |
| 5,793,374 | 8/1998 | Guenter et al. | 345/426 |

OTHER PUBLICATIONS

Briggs, Preston, "Coloring Register Pairs", ACM Lett. Program Lang. Syst. p. 3–13, Mar. 1992.

Briggs, Preston, "Improvements to Graph Coloring Register Allocation", ACM Trans. Program. Lang. Syst. p. 428–455, May 1994.

McConnell, Carl, "Using Single Assignment Form in a Cide Optimizer", ACM Lett. Program. Lang. Syst. p. 152–160.

Cytron et al., "Efficient Accommodation of May–Allias Information in SSA Form, " (1993 ACM), pp. 36–45.

*Primary Examiner*—Tariq R. Hafiz
*Assistant Examiner*—John Q. Chavis
*Attorney, Agent, or Firm*—Blakely, Sokoloff, Taylor & Zafman LLP

[57] ABSTRACT

The invention is a method of using static single assignment intermediate language to color out artificial register dependencies while compiling at least a portion of a computer program. The method comprises creating a rank-n SSA intermediate language representation of the computer program, wherein n is a positive integer greater than 1; and coloring out the artificial register dependencies.

22 Claims, 12 Drawing Sheets

```
┌─────────────────────────────────────────────────────────┐
│ Create a rank-n SSA intermediate language representation│
└─────────────────────────────────────────────────────────┘
                              │
                              ▼
        ┌─────────────────────────────────────────┐
        │ Color out artificial register dependencies│
        └─────────────────────────────────────────┘
```

Figure 1

| Initial Intermediate Language Representation | Rank-0 SSA Intermediate Language Representation | Rank-1 SSA Intermediate Language Representation | Rank-2 SSA Intermediate Language Representation |
|---|---|---|---|
| $i = 1$ | $t_1 = 1$ | $t_1 = 1$ | $t_1 = 1$ |
| $a = 2 * i$ | $t_2 = 2 * t_1$ | $t_2 = 2 * t_1$ | $t_2 = 2 * t_1$ |
| $A[i] = a$ | $A[t_1] = t_2$ | $t_4 = t_2$ | $t_4 = t_2$ |
| $b = 2 * a$ | $t_3 = 2 * t_2$ | $t_3 = 2 * t_2$ | $t_3 = 2 * t_2$ |
| $c = A[i] * b$ | $c = A[t_1] * t_3$ | $c = t_4 * t_3$ | $c = t_4 * t_3$ |
| $B[A[i]] = a$ | $B[A[t_1]] = t_2$ | $B[t_4] = t_2$ | $t_6 = t_2$ |
| $d = B[A[i]]$ | $d = B[A][t_1]]$ | $d = B[t_4]$ | $d = t_6$ |

Figure 2B

| Initial Intermediate Language Representation | After Renaming and Phi-node Insertion | After PRE Utilizing Figure 4D | After Coloring Out |
|---|---|---|---|
| i = x + y<br>if (p) then<br>{x = A[i]}<br>•<br>•<br>•<br>else<br>{y = A[i]}<br>{a = b}<br>{c = a}<br>•<br>•<br>•<br>z = A[i]<br>a = 2 * b | $t_1$ = x + y<br>if (p) then<br>{$t_2$ = A[$t_1$]}<br>•<br>•<br>•<br>else<br>{$t_7$ = A[$t_1$]}<br>{$t_8$ = b}<br>{$t_9$ = $t_8$}<br>•<br>•<br>•<br>$t_3$=Φ(A[$t_1$],A[$t_1$])<br>$t_4$ = Φ(b,$t_8$)<br>$t_5$ = A[$t_1$]<br>$t_6$ = 2 * $t_4$ | $t_1$ = x + y<br>$t_4$ = b<br>if (p) then<br>{$t_2$ = A[$t_1$]}<br>•<br>•<br>•<br>else<br>{$t_7$ = A[$t_1$]}<br>{$t_9$ = $t_8$}<br>•<br>•<br>•<br>$t_3$=Φ(A[$t_1$],A[$t_1$])<br>$t_4$ = Φ($t_4$,$t_4$)<br>$t_5$ = A[$t_1$]<br>$t_6$ = 2 * $t_4$ | $t_1$ = x + y<br>$t_4$ = b<br>if (p) then<br>{$t_{10}$ = A[$t_1$]}<br>•<br>•<br>•<br>else<br>{$t_{10}$ = A[$t_1$]}<br>{$t_9$ = $t_8$}<br>•<br>•<br>•<br>$t_{10}$=Φ(A[$t_1$],A[$t_1$])<br>$t_4$ = Φ($t_4$,$t_4$)<br>$t_{10}$ = A[$t_1$]<br>$t_6$ = 2 * $t_4$ |

Figure 4B

METHOD FOR USING STATIC SINGLE ASSIGNMENT TO COLOR OUT ARTIFICIAL REGISTER DEPENDENCIES

BACKGROUND OF THE INVENTION

Field of the Invention

The invention is a computer-implemented method and apparatus for managing register allocation during while compiling a computer program into machine readable object code. More particularly, the invention is a method and apparatus for "coloring out" artificial register dependencies as set forth more fully below.

Related Applications

The invention disclosed and claimed herein is related to the following applications:
(1) my U.S. patent application Ser. No. 08/831,024, filed Apr. 1, 1997 entitled "A Method for Constructing a Static Single Assignment Language Accommodating Arbitrarily Complex Symbolic Memory References" (Attorney Docket No. INPA:002/P3497);
(2) my U.S. patent application Ser. No. 08/829,856, filed Apr. 1, 1997 entitled "A Method for Performing Common Subexpression Elimination on a Rank-n Static Single Assignment Language" (Attorney Docket No. INPA:016/P3938);
(3) my U.S. patent application Ser. No. 08/829,847, filed Apr. 1, 1997 entitled "A Method for Identifying Partial Redundancies in Existing Processor Architectures" (Attorney Docket No. INPA:014/P3936);
(4) my U.S. patent application Ser. No. 08/829,933, filed Apr. 1, 1997 entitled "A Method for Identifying Partial Redundancies in a New Processor Architectures" (Attorney Docket No. INPA:021/P4306);
(5) my U.S. patent application Ser. No. 08/831,159, filed Apr. 1, 1997 entitled "A Method for Determining the Set of Variables that May Be Ambiguously Defined at a Point in a Computer Program" (Attorney Docket No. INPA:015/P3937); and
(6) my U.S. patent application Ser. No. 08/829,980, filed Apr. 1, 1997 entitled "A Method for Optimizing a Loop in a Computer Program by Removing Loop-Invariant Loads Outside of a Loop" (Attorney Docket No. INPA:017/P3939);

These applications are hereby expressly incorporated by reference for all permissible purposes as if expressly set forth verbatim herein.

DESCRIPTION OF THE RELATED ART

Most computer programmers write computer programs in source code using high-level languages such as BASIC, C, FORTRAN, or PASCAL. While programmers may easily understand such languages, modern computers are not able to directly read such languages. Thus, such computer programs must be translated into a language, known as machine language, that a computer can read and execute. One step in the translating process is performed by a compiler. A compiler translates a source code program, sometimes also called the source code, into object code. Object code is a machine language description of a high-level computer program. The fundamentals of compiling a high-level language into object code are well known in the art. See, e.g., Aho et al, *Compilers-Principles, Techniques and Tools* (Addison-Wesley Publishing Co. 1988).

Object code produced by conventional compiling algorithms can often be "optimized," i.e., made to execute faster.

Compilers that apply code-improving transformations are called optimizing compilers. Some conventional optimizing compilers translate high-level computer programs into an intermediate language known as a Static Single Assignment (SSA) representation before generating the object code. This SSA intermediate language is used as a basis to perform certain optimizations. After these optimizations are performed, these conventional optimizing compilers translate, or generate, the SSA intermediate language into optimized object code. A deeper explanation of SSA intermediate languages follows and employs the terminology set forth immediately below.

A statement in a computer program is said to "define" a variable if it assigns, or may assign, a value to that variable. For example, the statement "x=y+z" is said to "define" x. A statement that defines a variable contains a "definition" of that variable. In this context, there are two types of variable definitions: unambiguous definitions and ambiguous definitions. Ambiguous definitions may also be called complex definitions.

When a definition always defines the same variable, the definition is said to be an "unambiguous definition" of that variable. For example, the statement, "x=y" always assigns the value of y to x. Such a statement always defines the variable x with the value of y. Thus, the statement "x=y" is an "unambiguous definition" of x. If all definitions in a particular segment of code are unambiguous definitions, then the variable is known as an unambiguous variable.

Some definitions do not always define the same variable. These definitions may possibly define different variables at different times in a computer program. Thus, they are called "ambiguous definitions." There are many types of ambiguous definitions and the principle common denominator among the many types is that they are not unambiguous definitions. One type of "ambiguous definition" occurs where a pointer refers to a variable. For example, the statement "*p=y may be a definition of x since it is possible that the pointer p points to x. Thus, the definition may ambiguously define any variable x if it is possible that p points to x. In other words, *p may define one of several variables depending on the value of p. Another type of ambiguous definition is a call of a procedure with a variable passed by reference. When a variable is passed by reference, the address of the variable is passed to the procedure. Passing a variable by reference to a procedure allows the procedure to modify the variable. Alternatively, variables may be passed by value. When a variable is passed by value, only the value of the variable is passed to the procedure. Passing a variable by value does not allow the procedure to modify the variable. Still another type of ambiguous definition is a procedure that can access a variable because that variable is within the scope of the procedure. Another type of ambiguous definition occurs when a variable is not within the scope of a procedure but the variable has been identified with another variable that is passed as a parameter or is within the scope of the procedure.

When a statement in a computer program references a variable, the statement is said to "use" the variable. For example, the statement "x=y+z" refers to and is said to "use" y and z while unambiguously defining x. Similarly, y and z (but not x) are "used" in the statement "x[y]=z" while unambiguously defining x[y]. A statement that uses a variable contains a "use" of that variable.

A definition of a variable "reaches" a use of that variable if that definition is the last definition of that variable prior to the use. Consider the following straight-line C pseudo code:

x=6 x=x+5 x=7 x=x+8

The definition in the first statement "x=6" reaches the use in the second statement "x=x+5." Similarly, the definition in the third statement "x=7" reaches the use in the fourth statement "x=x+8." Note that the definition in the first statement does not reach the use of the fourth statement because x is redefined in the second and third statements.

In the above example, the unambiguous definition of x in the second statement is said to "kill" the definition of x in the first statement because it nullifies the effects of the definition in the first statement. Similarly, the definitions of x in the third and fourth statements kill the definitions in the second and third statements, respectively. The period of time between the definition and the definition's kill is known as the definition's "lifetime." Only unambiguous definitions of a variable can kill other definitions of the variable. Thus, a use can be reached by both an unambiguous definition and a subsequent ambiguous definition of the same variable.

A computer programmer may address a variable by specifying the variable's location in memory. This location is known as the variable's absolute address. This method of addressing is known as direct addressing. Direct addressing commonly occurs when a variable is specified by its name. For example, in the statement "y=x," both y and x are directly addressed.

A computer programmer may also address a variable by specifying an address that refers to a different address, which may specify yet another address. This method of addressing is known as indirect addressing. Common examples of indirect addressing include pointers, arrays and combinations of pointers and arrays. Examples of indirect addressing include a[i], *p, *(p+4), **p, a[b[i]], and *(*p+4). When a variable is indirectly addressed, at least one indirect memory reference is employed to determine the absolute address of the variable.

A variable may be classified based upon the number of indirect memory references employed to determine the absolute address of the variable. For example, as discussed above, y and x may be directly addressed. Thus, there are zero indirect memory references employed to determine the absolute address of both y and x. These variables are known as rank-0 variables.

A variable employing a single indirect memory reference is known as a rank-1 variable. Examples of rank-1 variables include single pointer references and single array references such as a[i], *p, and *(p+4). A variable that requires two indirect memory references is known as a rank-2 variable. Rank-2 variables include double pointer references and double array references and the combination of a single pointer reference and a single array reference. Examples of rank-2 variables include **p, a[b[i]], and *(*p+4). A rank-n variable employs n indirect memory references to determine the absolute address of the variable.

A definition that defines a rank-n variable is known as a rank-n definition. Similarly a use of a rank-n variable is known as a rank-n use. For example, the definition of the array element b[a[i]] is a rank-0 use of the variable i, a rank-1 use of the array element a[i], and a rank-2 definition of the array element b[a[i]].

Returning to the discussion of SSA intermediate languages, when a computer program is conventionally translated into a SSA intermediate language, each variable definition is given a unique name. Further, all the uses reached by that definition are also renamed to match the variable's new name. For example, consider the straight-line C pseudo code discussed above. When this C pseudo code is translated into a SSA intermediate language, the result would be the following:

$t_1 = 6$ $t_2 = t_1 + 5$ $t_3 = 7$ $t_4 = t_3 + 8$

The symbols $t_1$ through $t_4$ are known as compiler temporaries or even more commonly as temps. Unlike most variables, temps have only a single definition. Because a temp has only a single definition, it may not be defined by an ambiguous definition. Thus, temps are unaliasable scalars. Because temps are unaliasable scalars, an expression using $t_1$ has a different symbolic meaning from the symbolic meaning of an otherwise identical expression using i. Every use of i cannot be considered equal because i represents an aliasable variable. However, every use of $t_1$ can be considered equal. While a compiler may not be able to determine the value contained in a temp, every use of that temp will return the same unknown value. Therefore, temps dramatically simplify certain compiler algorithms.

Unlike the above straight-line C pseudo code, programs typically also contain branch statements. A branch statement is a statement that selects one set of statements from a number of alternative sets of statements. For example, consider the following if-then-else statement:

$$\text{if } (p) \text{ then}$$
$$\{x = 4\}$$
$$\text{else}$$
$$\{x = 6\}$$
$$x = 2 + x$$

The flow of control through this code segment during execution will branch depending on whether the p is true or false and will unite again at the statement "x=2* x". The point where the flow of control branches is known as the branch point and the point where it unites is known as the "join point" or the "confluence point."

When this C pseudo code is translated into a SSA intermediate language, the result would be the following:

$$\text{if } (p) \text{ then}$$
$$\{t_1 = 4\}$$
$$\text{else}$$
$$\{t_2 = 6\}$$
$$t_3 = \Phi(t_1, t_2)$$
$$t_4 = 2 + t_3$$

Depending on the value of p, either $t_1$ will be defined as 4 or $t_2$ will be defined as 6. In order to "join" these two definitions, a special definition called a phi-function is inserted at the point where the branches join. Phi-functions are known by those skilled in the art.

The above phi-function contains two operands. An operand is a quantity that enters into (or results from) an operation. The operands indicate which definitions reach the join point. In this example, both $t_1$ and $t_2$ reach the join point. Thus, both $t_1$ and $t_2$ are operands to the phi-function that defines $t_3$. As shown above, subsequent uses of x in the original program would use $t_3$ in the corresponding SSA intermediate language.

Conventional SSA intermediate languages can accommodate only rank-0 variables. Ambiguous definitions and uses reached by ambiguous definitions cannot be renamed as temps. Phi-nodes also cannot be inserted in conventional SSA intermediate languages without temps. Therefore, phi-nodes cannot conventionally be inserted in the presence of ambiguity interjected by ambiguous definitions and their uses. Thus, rank-1 and rank-2 variables are not included in conventional SSA intermediate languages. Because such intermediate languages contain only a limited amount of symbolic information, only limited optimizations may be based on such languages. Thus, in order to perform significant optimizations, numerous ad hoc algorithms are employed. These conventional algorithms are inefficient, incomplete, not well defined, and complex.

One of the most important compiler optimizations is the elimination of unnecessary memory loads and stores, which means that a primary optimization goal is to store as many variables as possible in registers. A "register" is a high speed storage element and, when operands of an instruction are stored in registers, then the instruction may be executed rapidly. The number of registers available at any time is limited and, when the registers become fall, resort must be had to other memory types whose utilization greatly slows instruction execution relative to registers. Hence, the desire to eliminate or minimize unnecessary memory loads and stores by maximizing register utilization.

However, conventional compilers do not always utilize all registers that are available, frequently because compilers are unable to locate artificial register dependencies, i.e., unnecessary utilization of registers for multiple, symbolically equivalent expressions. Thus, optimizing compilers need a method to locate and remove artificial register dependencies. The process of managing register allocation and content is known as "coloring" or "graph coloring" and is well known in the art in several manifestations. See, e.g., Aho et al, *Compilers-Principles, Techniques and Tools*, pp. 545–46 (Addison-Wesley Publishing Co. 1988); Chaitin et. al., "Register Allocation via Coloring," 6 *Computer Languages* 47 (Pergamon Press Ltd. 1981); Chow & Hennessy, "The Priority-Based Coloring Approach to Register Allocation," 12 ACM Transactions on Programming Languages and Systems 501 (1990). Removing artificial register dependencies is one form of "coloring" that will be referred to herein as "coloring out."

SUMMARY OF THE INVENTION

The invention is a method of using static single assignment intermediate language to color out artificial register dependencies while compiling at least a portion of source code. The method comprises creating a rank-n SSA intermediate language representation of the source code, wherein n is a positive integer greater than 1; and coloring out the artificial register dependencies.

BRIEF DESCRIPTION OF THE DRAWINGS

A more particular description of the invention briefly summarized above is set forth below by way of particular embodiments disclosed in the drawings of this specification and as described in connection therewith. The drawings nevertheless illustrate only typical, particular embodiments of the invention and are not to be considered limiting thereon as the invention may admit to other equally effective embodiments. In the drawings:

FIG. 1 depicts a particular embodiment of the invention;

FIG. 2B illustrates code transformation during the multiple passes of rank-n SSA intermediate language representation construction diagrammed in FIG. 2A;

FIGS. 4B–4D illustrate the partial redundancy elimination technique employed in FIG. 4A in greater detail.

DESCRIPTION OF PARTICULAR EMBODIMENTS

Numerous specific details are set forth below in the detailed description of particular embodiments in order to provide a thorough understanding of the present invention. However, one of ordinary skill in the art having the benefit of this disclosure will understand that the present invention may be practiced without many of the details presented since such details will be necessary or useful depending on the particular embodiment being employed. Conversely, in other instances, well known details have not been described in detail for the sake of clarity so as not to obscure the invention. It will be appreciated that supplying such details would be a routine undertaking for those of ordinary skill in the art, even if a complex and time-consuming task, given the benefit of this disclosure.

FIG. 1 illustrates the method of the present invention for using static single assignment ("SSA") to color out artificial register dependencies. Broadly speaking, as shown therein, the compiler first generates a rank-n SSA intermediate language representation. This has the benefit of ensuring that any use of a variable expression will be reached by, at most, one definition even in the presence of arbitrarily complex expressions. The compiler next colors out the artificial register dependencies in the rank-n SSA intermediate language representation.

Figure 2A:
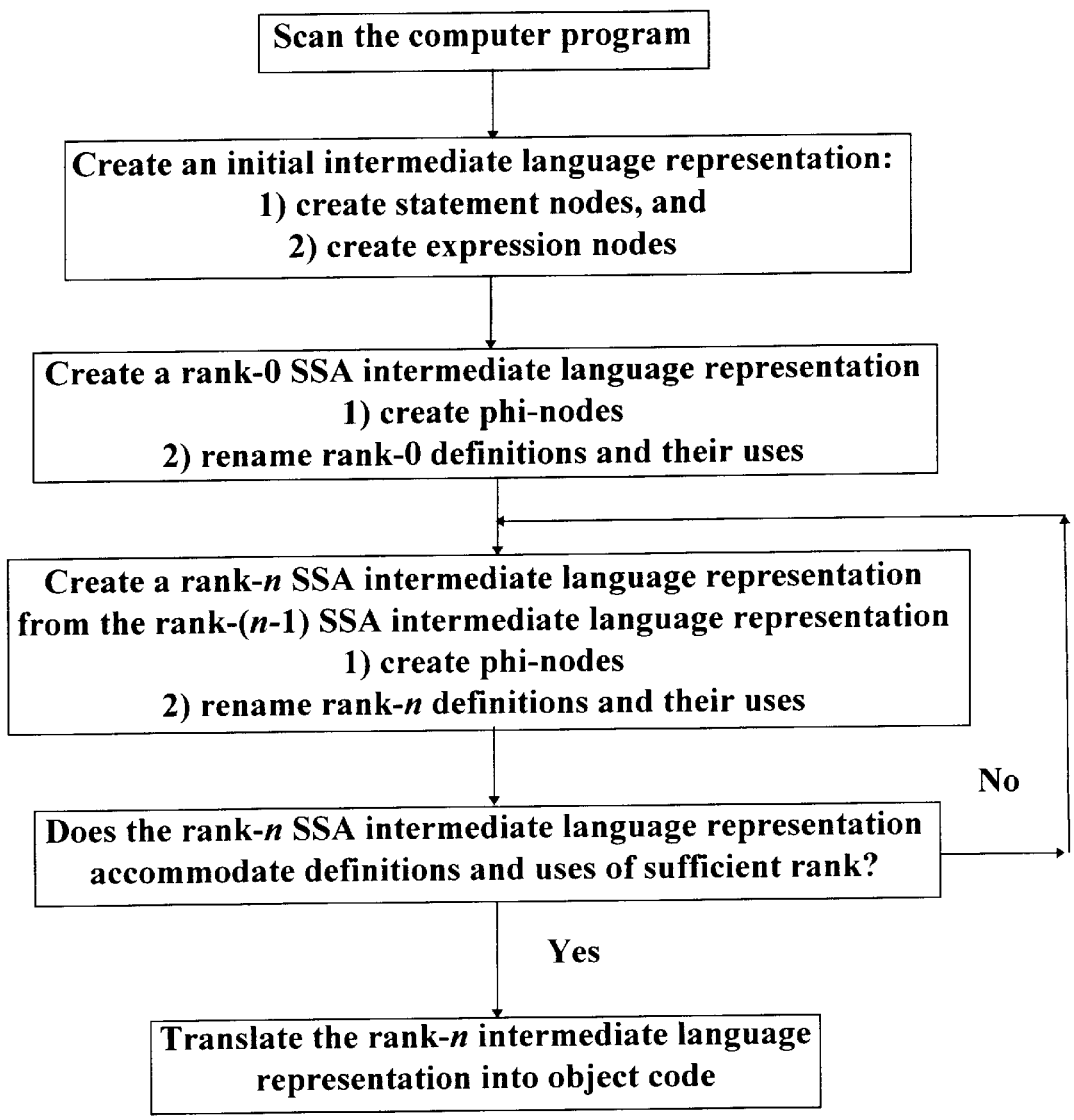
FIG. 2A diagrams the construction of a rank-n SSA intermediate language representation of at least a portion of source code as is disclosed and claimed in my application Ser. No. 08/831,074, entitled "Method for Constructing a Static Single Assignment Language Accommodating Complex Symbolic Memory References;"

FIG. 2A illustrates creating a rank-n SSA intermediate language representation in greater detail as is more fully disclosed and claimed in my application Ser. No. 08/831, 074, filed herewith, and entitled "Method for Constructing a Static Single Assignment Language Accommodating Complex Symbolic Memory References." This application Ser. No. 08/831,074, is hereby expressly incorporated for all purposes. The particular embodiment of FIG. 2A actually covers the entire process from scanning the source code to generating the machine readable object, but such is not necessary to the practice of the invention as is discussed below. Furthermore, the method of FIG. 2A is performed without regard to coloring out. Incorporating the method of FIG. 2A into the present invention to color out artificial register dependencies will be discussed below.

FIG. 2A represents one embodiment of a method for creating a static single assignment (SSA) intermediate language that can accommodate rank-n variables. A SSA intermediate language that can accommodate rank-n variables will be referred to as a rank-n SSA intermediate language.

Referring to FIG. 2A, the compiler first generates a rank-n SSA intermediate language is performing a linear analysis of a source computer program. The source computer program typically will be in a high-level language however, it may also be stored in a lower-level language. This linear analysis is often called scanning. Scanning is well known by those skilled in the art. The stream of characters in the source computer program is typically read from left to right. When the stream of characters is scanned, the characters are grouped into sequences of characters having a collective meaning. These sequences of characters are known as tokens. The character stream "area=2*pi*r" could be grouped into the following tokens:
(1) The identifier area;
(2) The assignment symbol =;
(3) The number 2;
(4) The multiplication sign;
(5) The identifier pi;
(6) The multiplication sign; and
(7) The identifier r.
The result of scanning the source computer program is a plurality of tokens. The blanks between the tokens are typically eliminated.

Referring again to FIG. 2A, after scanning the source computer program, the plurality of tokens are grouped into a hierarchical structure that will be referred to as an intermediate language. A hierarchical structure is a structure having several levels arranged in a tree-like structure. This grouping of the tokens is known by those skilled in the art as parsing. Common parsing methods include top-down and bottom-up methods. The intermediate language may be represented by a parse tree. While it may be helpful to think of a parse tree being constructed, it is not necessary to construct a formal parse tree. All that is needed is a data structure containing the relationship between the tokens. In one embodiment there may be two major types of nodes in the intermediate language: statement nodes and expression nodes. The particular types of nodes used in the intermediate language is immaterial. All that is necessary is that the statements and expressions in the source computer program be properly related in a data structure.

Statement nodes represent program constructs. A program construct is a statement or a part of a statement in a computer language. Common program constructs include: assign, if, while, goto, switch, repeat, call, and return. Statement nodes contain program flow information. Typically, a field in a statement node includes a pointer to one or more other statement nodes. For example, a field in a statement node that represents the assign program construct may point to a previous statement node and another field may point to a subsequent statement node. A statement node that represents the assign program construct typically contains one definition and possibly one or more uses.

Statement nodes may represent conditional constructs. A conditional construct is a statement or part of a statement that specifies several different execution sequences. Examples of conditional constructs include: if, while, goto, switch, repeat, call, and return. Statement nodes that represent conditional constructs include control flow information. For example, a statement node that represents the "if" conditional construct may contain two additional pointers. The first pointer would point to a statement node that is to be executed if a given expression is true. The second pointer would point to a statement node that is to be executed if the given expression is false. A statement node that represents an if-then-else conditional program construct may optimally include the following information.

(1) Number: A unique integer that allow reference to a particular statement node via an integer index.
(2) Predecessor: A pointer to a previous statement node. This pointer allows the statement nodes to be efficiently stored in a doubly linked list.
(3) Successor: A pointer to a subsequent statement node.
(4) SATT: A bitset of statement node attributes. Possible attributes of a statement node include processed, optimized, and unreachable.
(5) DBG-node: A field that allows attachment of debugger annotations.
(6) Bblock: The basic block that contains the statement;
(7) Ins: The uses of the expression.
(8) Outs: The definitions of the expression.
(9) If-expr: The expression that is to be evaluated by an if statement. This expression predicates whether the true side or the false side is to be taken.
(10) If-true: The first statement to be executed if the if-expr is true.
(11) If-false: The first statement to be executed if the if-expr is false.

Expression nodes represent expressions. An expression is a program construct for computing a value from one or more operands such as constants, variables, temps, and/or pointers. An expression may be thought of as a group of constants or variables separated by operators that yield a single value. Common operators include: add, subtract, multiply, divide, shift left, shift right, and convert. An expression may be arithmetic, relational, logical, or even a character string.

An individual expression node may represent an operation, a scalar variable, an array variable, a constant, a temp, or a memory reference. A scalar variable is a variable that represents a single data item. A scalar variable may be contrasted with an array variable that represents many data items.

Expression nodes that represent operations may contain two fields that point to other expression nodes. One of the fields may point to another expression node that represents another operation. The second field may point to an expression node that represents a constant, a variable, or a temp. For example, the expression "a+b+4+$t_5$" may be represented by the following grouping of expression nodes:

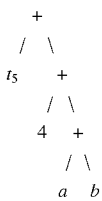

The expression "A[i][j]" may be may be represented by the following grouping of expression nodes:

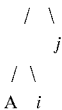

An expression node for an operation such as "addition" may optimally include the following information.
(1) Number: A unique integer that allow reference to a particular expression via an integer index.
(2) OP: A word indicating the operation of the expression node.
(3) Succ-cnt: The number of operands in the expression tree of the expression node. (The number of operands varies depending upon the operation.)
(4) N-words: pointers to the operands in the expression tree.

Expression nodes are typically used as operands for statement nodes. For example, consider the following if-then-else statement.

if $(x = 5)$ then $\{x = 4\}$ else $\{x = 6\}$ $x = 2^{*}x$

Figure 2C:
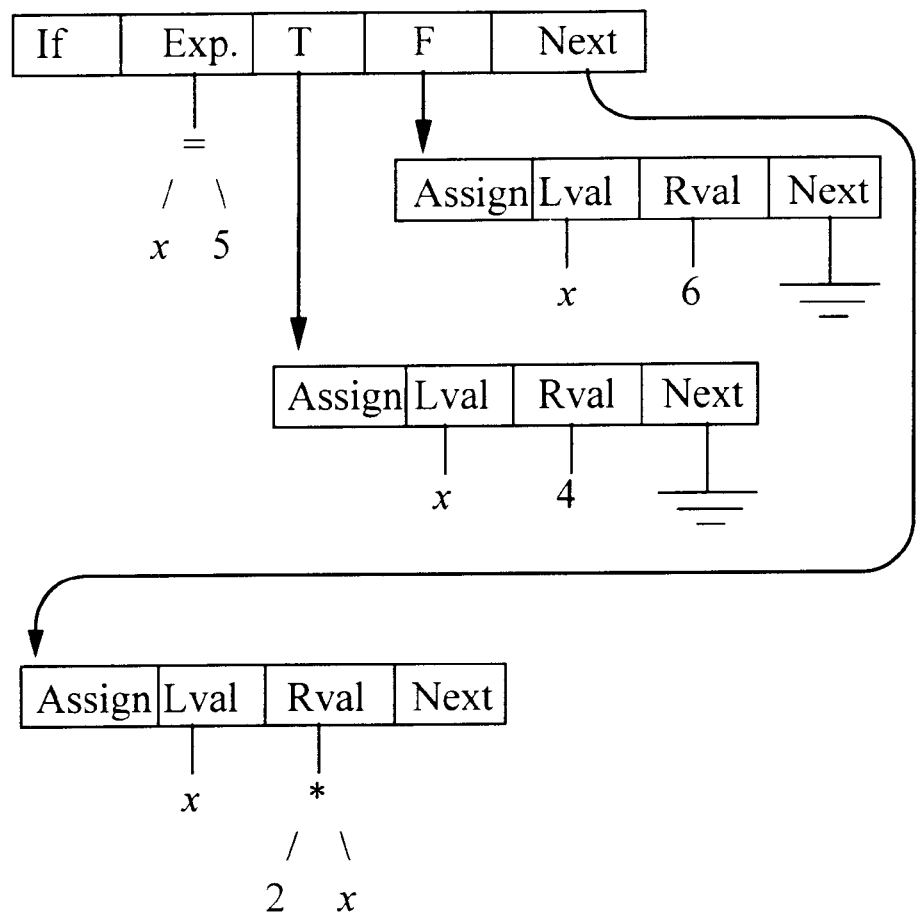
FIG. 2C presents an intermediate language representation of an if-then-else statement.

This statement may be represented by the group of nodes shown in FIG. 2C.

Referring again to FIG. 2A, the tokens are next translated into nodes. If a token represents a program construct, then a statement node is created in the intermediate language that represents the program construct. This statement node typically includes program flow information and possibly control flow information.

If a token represents an expression, then an expression node is created in the intermediate language that represents the expression. Typically, these expression nodes are operands to statement nodes.

Referring again to FIG. 2A, after the intermediate language is created, then a rank-0 SSA intermediate language is created.

When creating the rank-0 SSA intermediate language certain definitions and uses are renamed. A search of the intermediate language is made for any statement nodes that contain a rank-0 definition of a variable that reaches a statement node containing a rank-0 use of that variable. A depth-first search of the intermediate language may be optimal because it provides an efficient searching method. A depth-first search is a search of a hierarchical data structure that first chooses one of the possible branches of a search tree, proceeds along the chosen branch until the goal or a predetermined depth is reached, and if the goal has not been reached, goes back to the starting point and chooses another branch. Depth-first searches of hierarchical data structures are known by those skilled in the art. If a statement node that contains a rank-0 definition that reaches a statement node containing a rank-0 use is found during the depth-first search, then the rank-0 definition and the rank-0 use are renamed with a temp.

Consider the series of intermediate language computer program statements shown in FIG. 2B. This series includes a rank-0 definition of the variable i that reaches five rank-0 uses of i. Thus, as shown in FIG. 2B, when the rank-0 SSA intermediate language is created, i will be renamed to $t_1$ in the rank-0 definition and the five rank-0 uses. This renaming may occur because each of the five uses of i in the intermediate language will return the same value when the computer program is executed.

Next, a search is made through the intermediate language for join points. A special statement node, known as a phi-node, is typically inserted in the rank-0 SSA intermediate language at certain join points. A phi-node may optimally include the following information.
(1) Number: A unique integer that allow reference to a particular phi-node via an integer index.
(2) Predecessor: A pointer to a previous phi-node. This pointer allows the phi-nodes to be efficiently stored in a doubly linked list.
(3) Successor: A pointer to a subsequent phi-node.
(4) SATT: A bitset of phi-node attributes. Possible attributes of a phi-node include processed, optimized, and unreachable.
(5) DBG-node: A field that allows attachment of debugger annotations.
(6) Bblock: The basic block that contains the phi-node.
(7) Ins: The uses of the phi-node.
(8) Lval: The variable definition
(9) Defs: The operand list of the phi-node.

Proper placement of phi-nodes may reduce the compiler execution time and may also reduce the execution time of the computer program. It is conservative, i.e., safe, but inefficient to place phi-nodes at every join point in the SSA intermediate language. A more optimal method may be placing a phi-node immediately preceding all statement nodes that contain a use that has multiple reaching definitions. Such uses may be located by performing a depth-first search of the rank-0 SSA intermediate language. Algorithms for placing phi-nodes are known in the art. Two such algorithms are shown in Ron Cryton et al., *Efficiently Computing Static Single Assignment Form and the Control Dependence Graph,* ACM Transactions on Programming Languages and Systems, Vol. 13, No. 4, October 1991 and Vugranam C. Sreedhar, *Efficient Program Analysis Using DJ Graphs,* Ph.D. Thesis, School of Computer Science, McGill Univ., Quebec, Canada (1995).

Referring again to FIG. 2A, a rank-1 SSA intermediate language may be created from the rank-0 SSA intermediate language. As discussed above, the rank-0 SSA intermediate language accommodates only rank-0 definitions and rank-0 uses. Rank-1 and higher rank definitions and uses are not accommodated. Rank-1 definitions and rank-1 uses may be accommodated by renaming all rank-1 definitions in the rank-0 SSA intermediate language that reach a use.

Consider the series of computer program statements in the rank-0 SSA intermediate language shown in FIG. 2B. The series contains a rank-1 definition and two rank-1 uses of the array element $A[t_1]$. Thus, as shown in FIG. 2B, when the rank-1 SSA intermediate language is created, $A[t_1]$ will be renamed to $t_4$ in the rank-1 definition and the two rank-1 uses. This renaming may be performed because both uses of $A[t_1]$ in the rank-0 SSA intermediate language will return the same value when the computer program is executed.

Generally, any rank-(n-1) SSA intermediate language may be translated into a rank-n SSA intermediate language, by renaming all rank-1 definitions in the rank-(n-1) SSA intermediate language that reach a use.

Consider the series of computer program statements in the rank-1 SSA intermediate language shown in FIG. 2B. In this example, the rank-1 SSA intermediate language will be considered to be a rank-(n-1) SSA intermediate language. The series contains a rank-1 definition and a rank-1 use of the array element $B[t_4]$. Thus, as shown in FIG. 2B, when a rank-n, i.e., rank-2, SSA intermediate language is created, $B[t_4]$ will be renamed to $t_6$ in the rank-1 definition and the rank-1 use.

The above renaming process may be repeated until a SSA intermediate language is created that accommodates definitions and uses of a sufficient rank.

As shown in FIG. 2A, after creating the initial intermediate language representation the compiler passes through it, creates phi-nodes, and renames all rank-0 definitions and their uses. This part of the creation is well known to those in the art, but what has heretofore gone unrecognized is the effect it has on the arbitrarily complex expressions whose ranks are greater than 0. The effect of multiple passes on arbitrarily complex expressions is illustrated in FIG. 2B, the second, third, and fourth columns representing individual passes in which renaming occurs. By comparing the first two columns of FIG. 2B, one can see that renaming reduces the complexity, or the number of indirect references, of all expressions whose rank is greater than 0 by one degree. For instance, the use of i in the variable expression A[i] is renamed and A[i] becomes $A[t_1]$ in the first pass, thereby reducing its complexity by one degree, whereupon it can be and is renamed $t_4$ in the second pass. Similarly, the variable expression B[A[i]] evolves through the renaming process to $B[A[t_1]]$, to, to $B[t_4]$, to $t_6$.

Thus, a sufficient number of multiple passes will reduce any arbitrarily complex expression to rank-0 so that it can also be renamed. Referring again to FIG. 2A, the compiler determines whether the current intermediate language representation accommodates definitions and uses of sufficient rank after the end of each pass. If any expression has a rank too high to have been accommodated by the current intermediate language representation, another pass is performed. The compiler iterates the phi-node creation and renaming until each expression in the intermediate language representation has been "accommodated", i.e., renamed to a compiler temporary.

Renaming an expression to a compiler temporary registerizes, i.e., places that expression's value in, a register. This increases "register pressure" by reducing the number of available registers. Register pressure is a concern even in generating rank-0 SSA intermediate language representations since compilers have only a limited number of registers. However, the concern is exacerbated in generating a rank-n SSA intermediate language representation since so many more expressions are renamed. Hence, the heightened desirability of "coloring out" artificial register dependencies to reduce register pressure and free up registers in generating rank-n SSA intermediate language representations.

For a more focused example, consider the following code:

$$i = x + y$$

```
if (p) then
    {x = A[i]}
    .
    .
    .
else
    {y = A[i]}
    .
    .
    .
z = A[i]
```

For the sake of clarity, only portions of the code relevant to the current discussion are presented. A phi-node is inserted for the global variable A[i] immediately after the join point:

$$i = x + y$$

```
if (p) then
    {x = A[i]}
    .
    .
    .
else
    {y = A[i]}
    .
    .
    .
A[i] = Φ(A[i], A[i])
z = A[i]
```

The definitions and their uses are then renamed:

$$t1 = x + y$$

```
if (p) then
    {t2 = A[i]}
    .
    .
    .
else
    {t5 = A[i]}
    .
    .
    .
t3 = Φ(A[t1], A[t1])
t4 = A[t1]
```

The variable expressions x, y, and p, and A[i] are not renamed because they are not defined in this segment of code and all expressions are now rank-0. Had any rank-2 or more complex expressions been involved, more passes would have been necessary.

Again referring to FIG. 2A, after the rank-n SSA intermediate language is created, it may be translated into object code or optionally into machine language. This translation enables a computer to directly execute the computer program. However, in accord with the present invention, translation into object code does not occur until after coloring out is performed.

Returning to FIG. 1, once the renaming is complete, coloring out can begin. Building on the example discussed immediately above, one of ordinary skill in the art having the benefit of this disclosure will recognize that the $t_2$, $t_3$, $t_4$, and $t_5$, are all defined using $A[t_1]$ and thus indicate the presence of at least one "artificial register dependency." Since these four temps are all defined using the same value number, e.g., the value number to which $A[t_1]$ maps, they are equivalent symbolic expressions and register pressure can be greatly reduced by "coloring out" those four registers into a single register. Conceptually, this is done by renaming, or registerizing, those four variable expressions in another pass.

Utilizing the example code above, the intermediate language representation after the renaming looks like:

$$t_1 = x + y$$

if (p) then $$\{t_2 = A[t_1]\}$$

.

.

.

else $$\{t_5 = A[t_1]\}$$

.

.

.

$$t_3 = \Phi(A[t_1], A[t_1])$$

$$t_4 = A[t_1]$$

Next, $t_2$, $t_3$, $t_4$, and $t_5$, are colored out by registerizing them into a single register:

$$t1 = x + y$$

if (p) then $$\{t6 = A[t1]\}$$

.

.

.

else $$\{t6 = A[t1]\}$$

.

.

.

$$t6 = \Phi(A[t1], A[t1])$$

$$t6 = A[t1]$$

In this manner, $t_2$, $t_3$, $t_4$, and $t_5$ are now freed for other functions thereby reducing the register pressure caused by the rank-n SSA intermediate language generation.

Figure 3A:
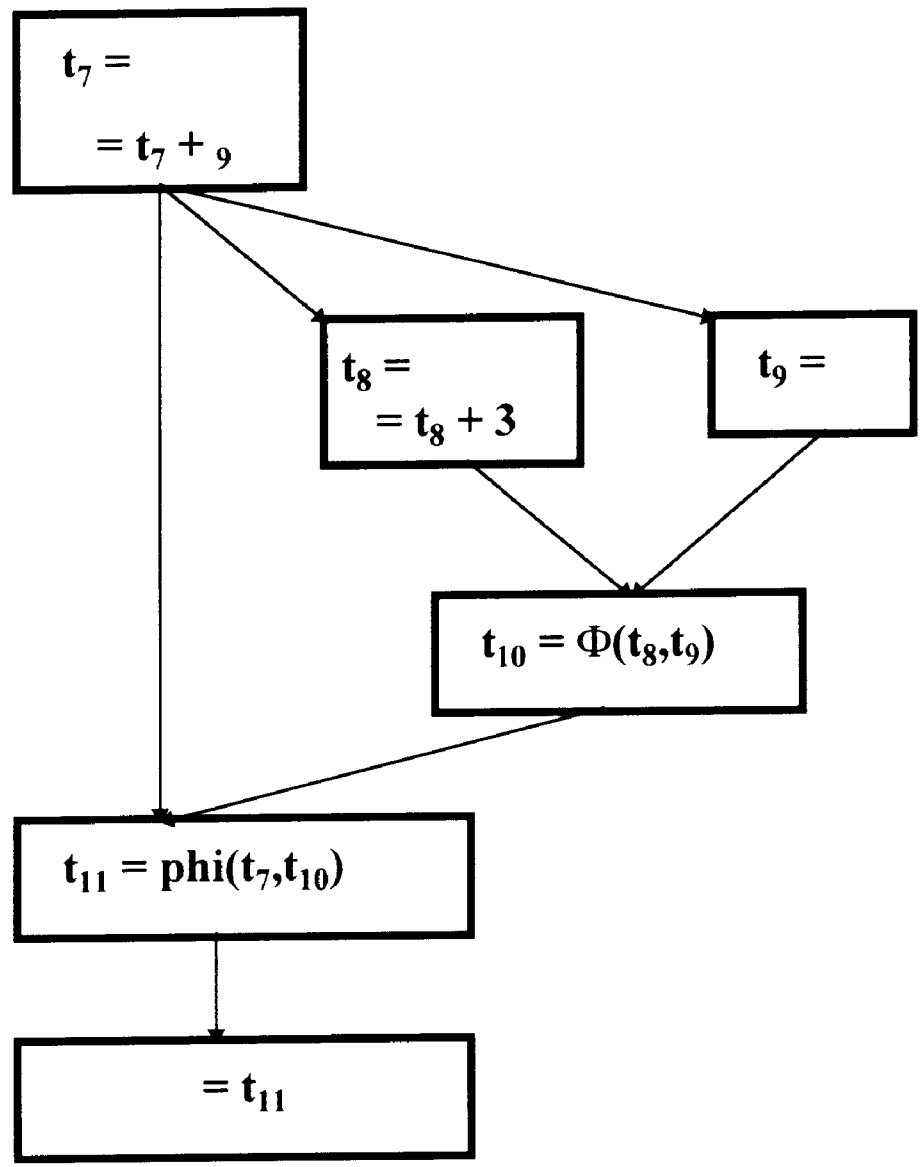
FIGS. 3A–3D diagram and illustrate an embodiment for coloring out artificial register dependencies in accord with the invention diagrammed in FIG. 1.

Alternatively to the method illustrated in FIG. 2A and described above, registers may be colored out using the method illustrated in FIGS. 3A–3. FIG. 3A illustrates a flow graph for a code segment exhibiting an artificial register dependency. Ideally, one would prefer to maintain instruction level parallelism. Instruction level parallelism cannot be maintained in the code sequence of FIG. 3A because the definition of $t_7$ reaches the definitions of $t_8$ and $t_9$ as well as $t_{11}$, thus requiring execution of the right-hand path before execution beyond the join point preceding the definition of $t_{11}$. Thus, there is an artificial register dependency in the code sequence of FIG. 3A.

Figure 3B:
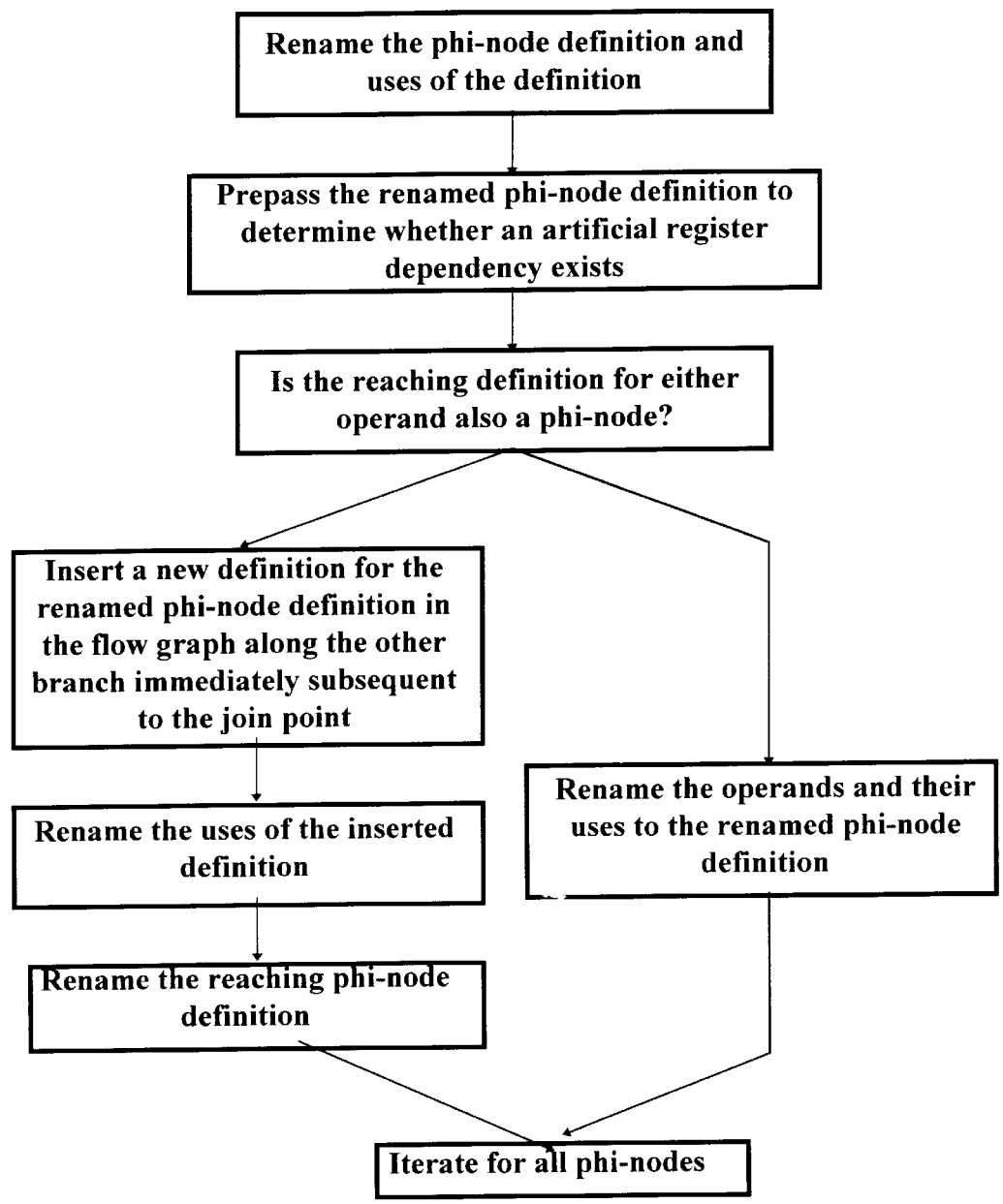

A method for coloring out artificial register dependencies employing code motion during renaming is set forth in FIG. 3B. The method is performed only for phi-nodes, and all other statements may treated as is set forth above. The compiler first renames the definition and all uses of the definition. Once the renaming is completed, for each phi node the compiler pre-passes the phi-node, i.e., seeks out the single, reaching for each of the operands in the phi-node. Recall that, in an SSA intermediate language, each rank-0 use will have only one reaching definition. If any operand's reaching definition is also a phi-node, then an artificial register dependency exists. The compiler then inserts a new definition for the renamed phi-node definition in the flow of control along the other branch, i.e., the one that does not lead to the reaching phi-node immediately subsequent to the join point. The inserted definitions define the renamed phi-node using the operand. The compiler next renames uses of the inserted definition and the reaching phi-node definition. If none of the reaching definitions is a phi-node, then the compiler simply renames the renamed phi-node's operands and their uses.

Figure 3C:
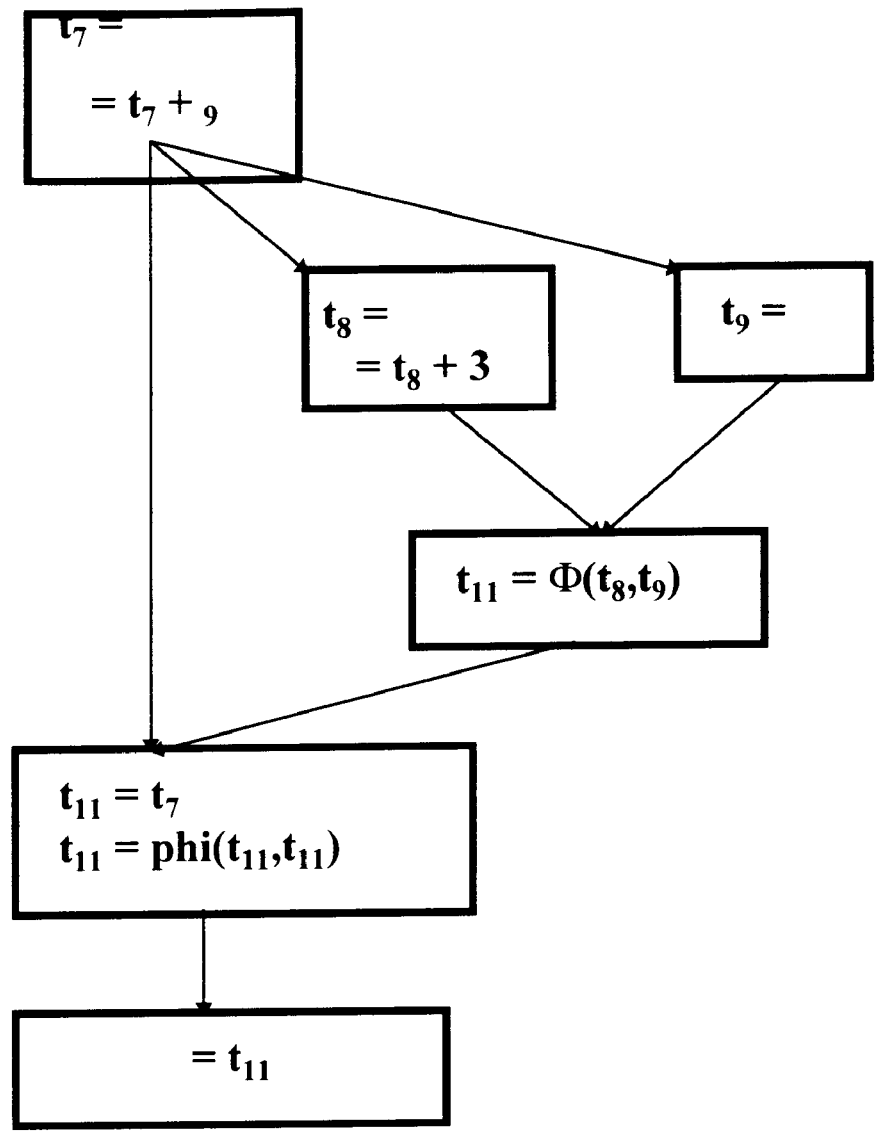
Figure 3D:
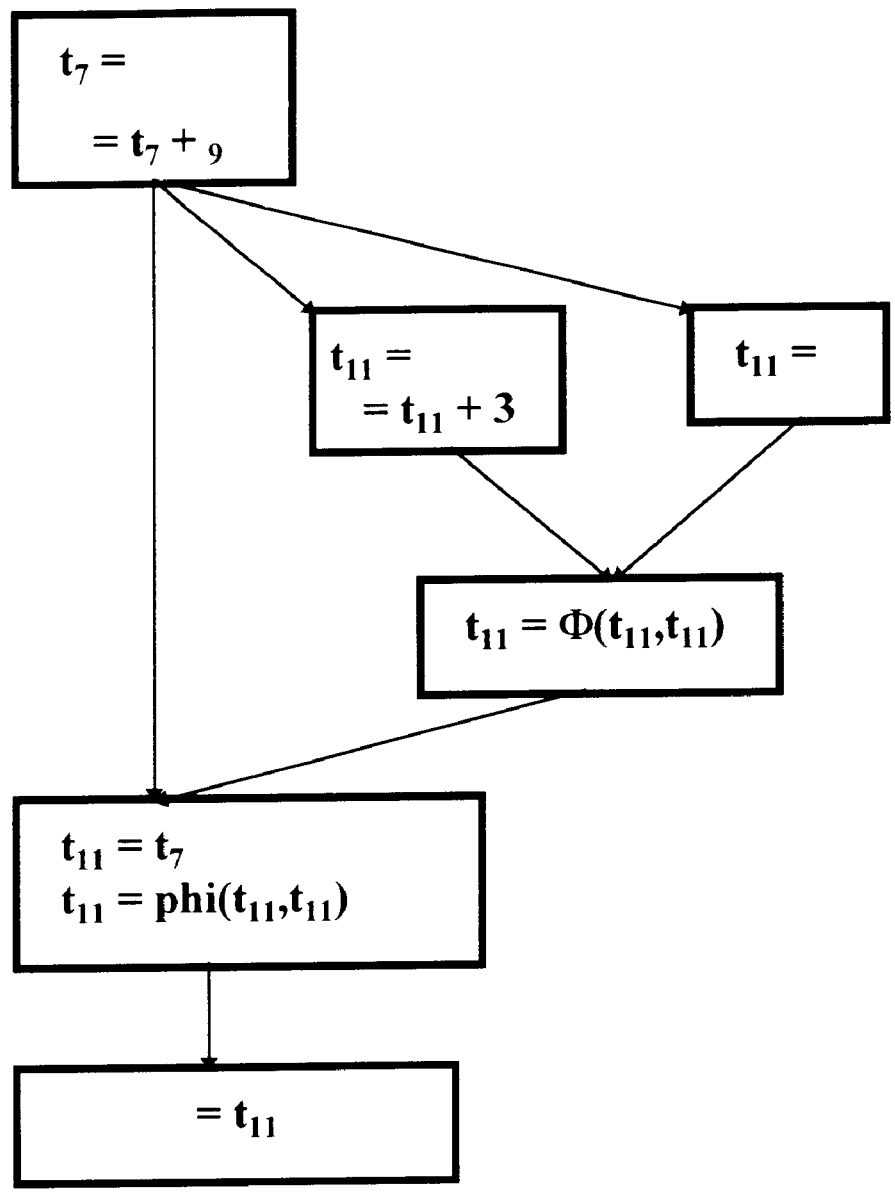
Figure 4A:
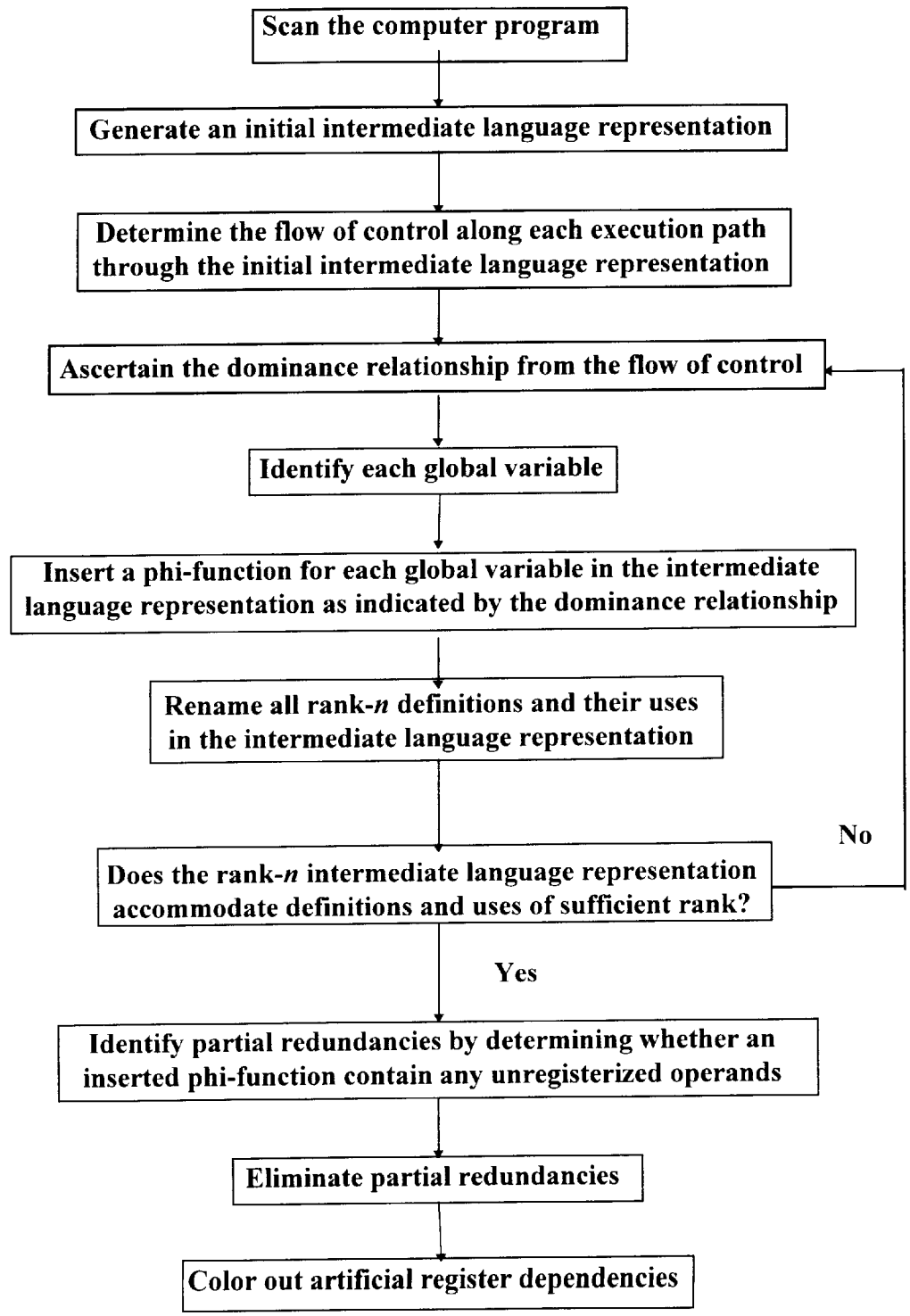
FIG. 4A depicts an alternative embodiment of the present invention in which coloring out is postponed until after partial redundancies in the rank-n SSA intermediate language representation are eliminated utilizing alternative, unique techniques disclosed and claimed in my application Ser. No. 08/829,847, entitled "A Method for Identifying and Eliminating Partial Redundancy in Existing Processor Architectures" and in my application Ser. No. 08/829,933, entitled "A Method for Identifying and Eliminating Partial Redundancies in a New Processor Architecture;"
Figure 4C:
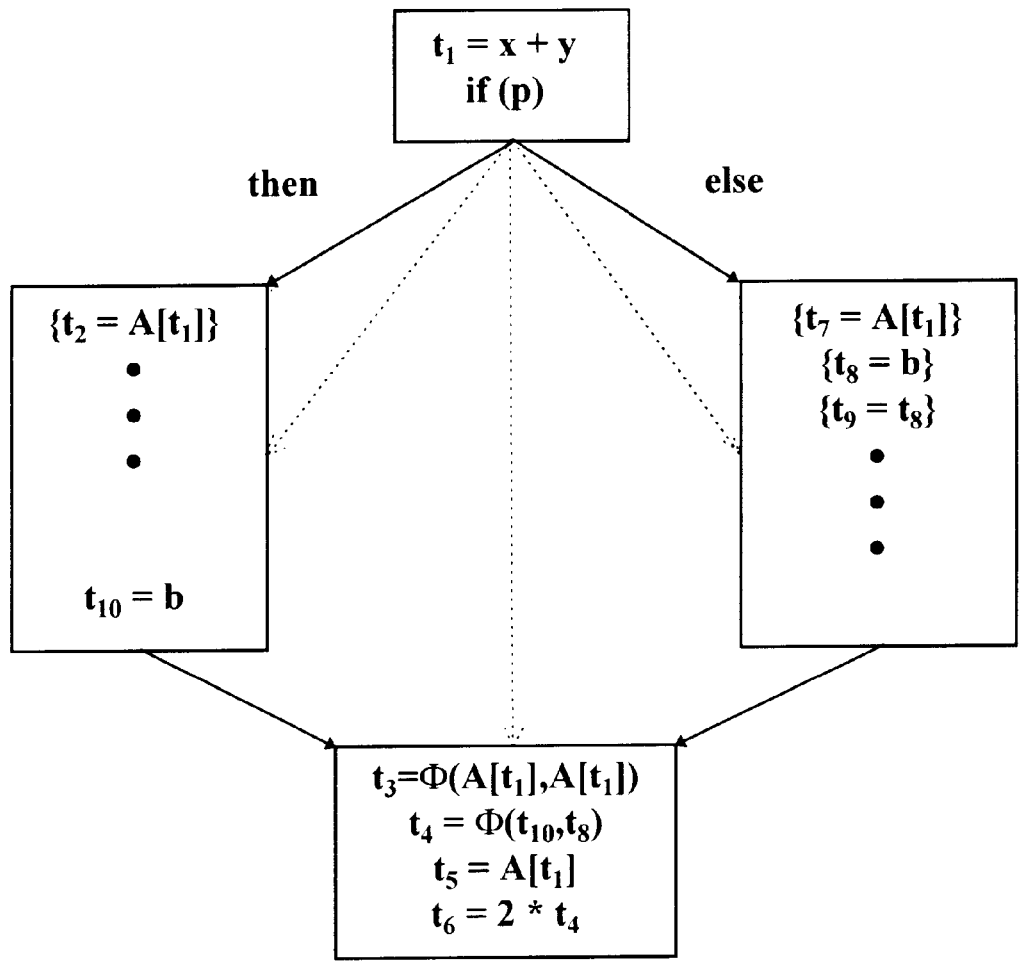
Figure 4D:
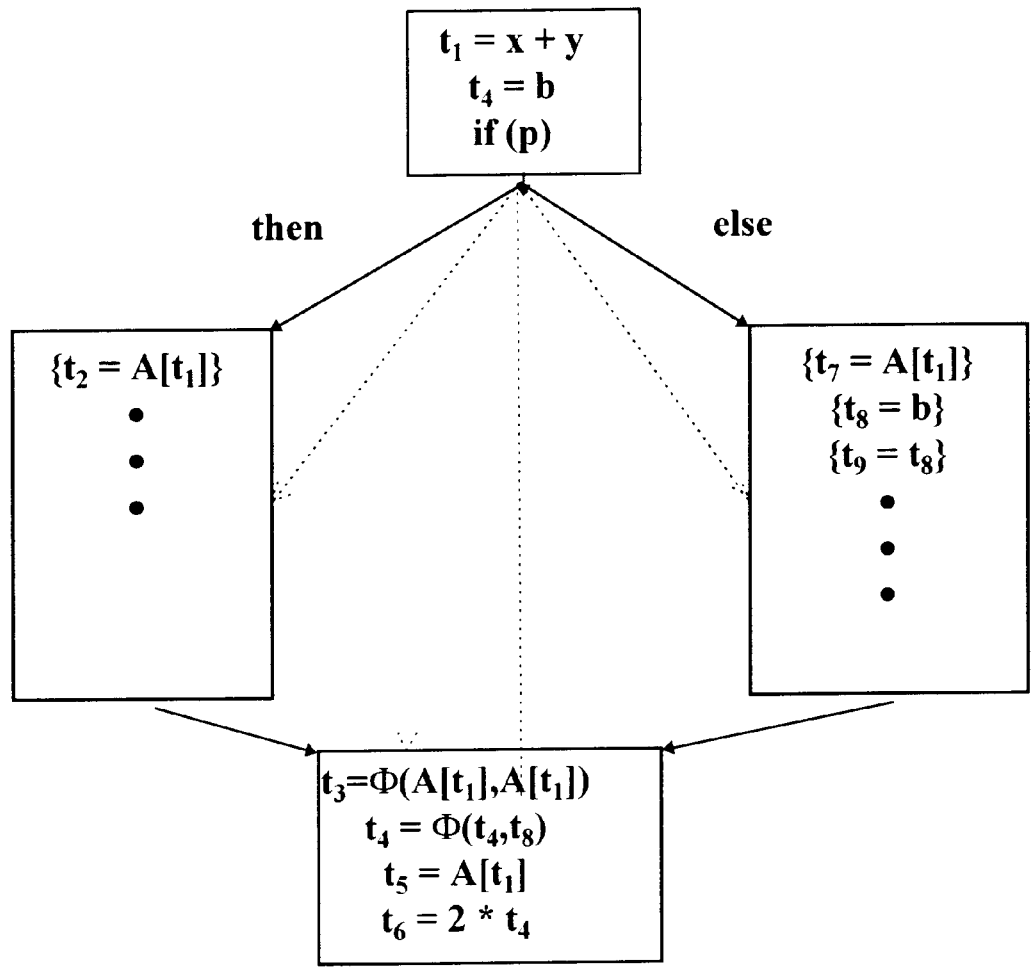

FIGS. 3C–3D provide a more concrete example using the code sequence and flow graph of FIG. 3A. Note that the definitions and their uses have already been renamed in FIG. 3A. In the course of a depth-first ordered traversal of the flow graph, the compiler visits the basic block containing the phi-node definition of $t_{11}$ and pre-passes the phi-node. The reaching definition for the operand $t_{10}$ is also a phi-node, so the compiler takes the left branch in the diagram of FIG. 3B. The compiler inserts a new definition for $t_{11}$ using $t_7$ at the point immediately subsequently to the join point, renames the uses of the inserted definition for $t_{11}$, and renames the reaching phi-node definition $t_{10}$ to $t_{11}$. The resulting code transformation are shown in FIG. 3C.

The compiler subsequently visits the basic block containing the phi-node renamed $t_{11}$ above and prepasses that phi-node. Neither of the reaching definitions for the operands is a phi-node, so the compiler takes the right branch of the diagram in FIG. 3B. The compiler consequently renames the reaching definitions of the operands and their uses to $t_{11}$. The resulting code transformation is illustrated in FIG. 3D.

As can be seen from FIG. 3D, this method maintains instruction level parallelism while eliminating artificial register dependencies. Further, while the examples of FIGS.

3A, 3C, and 3D involve a rank-0 SSA intermediate language representation, the method can be extrapolated to code sequences containing arbitrarily complex expressions. However, the method can only be implemented for renamed expressions, and therefore all operands of a given phi-node must be registerized before the technique can be implemented. As noted above, the generation of a rank-n SSA intermediate language representation will registerize all expressions in the code segment being compiled. The technique can therefore be iterated once for every pass in the rank-n SSA IL generation to more efficiently optimize the code by coloring out artificial register dependencies.

One specific embodiment of the invention employs a symbolic mapping technique that enables the compiler to determine whether value numbers in different registers are equivalent. A value number is an index into an abstract virtual memory. This memory typically stores symbolic expressions in a symbol table as set forth below. This particular mapping technique maps all global, unambiguous definition sites in a manner determining a unique integer for every symbolic expression.

When a computer program is translated into a SSA intermediate language representation, each symbolic expression is assigned a unique name. For instance, in the examples throughout this specification the variables renamed as temps $t_1$, $t_2$, etc. are symbols known as identifiers, as are the temps themselves. Identifiers are so called because they identify memory locations in which values are stored. Identifiers are combined with operators such as "+" and "−" and "*" to create symbolic expressions. Conditional and other flow control constructs such as if-then-else statements are not symbolic expressions although they may employ symbolic expressions.

Compilers traditionally "map" symbolic expressions like variables, temps, arrays, and pointers into a symbol table. A symbol table is a data structure comprising a record for each symbolic expression with selected information about that expression such as an absolute address. Mapping symbolic expressions into symbol tables provides a relatively quick table-lookup to determine the definition site of any symbolic expression as well as quickly store and retrieve data relative to the expression. Symbolic mapping and symbol tables are well known in the art.

Referring to the earlier example associated with FIG. 1, in the following SSA intermediate language representation:

$$t_1 = x + y$$
$$\text{if } (p) \text{ then}$$
$$\{t_2 = A[t_1]\}$$
·
·
·
$$else$$
$$\{t_5 = A[t_1]\}$$
·
·
·
·
$$t_3 = \Phi(A[t_1], A[t_1])$$
$$t_4 = A[t_1]$$

the temps $t_2$, $t_3$, $t_4$, and $t_5$ are all defined using $A[t_1]$. Each use of $A[t_1]$ is nevertheless considered part of a separate symbolic expression that is assigned a different name because each use occurs in a different part of the program. However, each of these symbolic expressions will map to a different record in the symbol table each of which contains the same or equivalent value number as explained below and each of $t_2$, $t_3$, $t_4$, and $t_5$.

More particularly, this specific embodiment employs a type of symbol table known as a "hash table." A hash table is a type of symbol table comprising an array of pointers to a series of table entries from which information can be extracted using a "hash function." The hash function calculates a "hash value" called a value number which was previously defined. The hash value or value number identifies the pointer in the array pointing to the table entry of interest. Each symbolic expression in this particular embodiment has one table entry in the symbol table and one pointer in the hash table's array pointing to the corresponding table entry in the hash table. This one pointer is located by the hash function and in this specific embodiment is a unique integer.

This particular embodiment uses three different functions to determine whether symbolic expressions are equivalent and can be colored out. These three functions may be called (1) a hash function, (2) a definition function, and (3) an equivalency function. The hash function retrieves the value number for any given symbolic expression. The definition function returns a definition number for any given expression. A definition number indicates a unique definition site in the intermediate language representation to which the symbolic expression is assigned during construction of the rank-n SSA intermediate language representation. The equivalency function indicates whether any two symbolic expressions may be equivalent.

Stated more technically, the hash function ($SYM_{13}$ Hash), definition function ($SYM_{13}$ Def), and equivalency function ($SYM_{13}$ Equal) may be employed together to symbolically map expressions as follows:

(1) $SYM\_Hash(E_1) \equiv SYM\_Hash(E_2)$ if, and only if, $SYM\_Equal(E_1, E_2)$ is true;

(2) $SYM\_Def(SYM\_Hash(E_1), B_1) \mathrel{!=} SYM\_Def(SYM\_Hash(E_2), B_2)$ if $SYM\_Hash(E_1) \equiv SYM\_Hash(E_2)$ and $B_1 \mathrel{!=} B_2$; and (3) $SYM\_Def\_Value(def\_1) \equiv SYM\_Def\_Value(def\_2)$ if, and only if, $SYM\_Hash(E_1) \equiv SYM\_Hash(E_2) \equiv n$ -continued and def_1 ≡ SYM_Def(n, B₁)

and def_2 ≡ SYM_Def(n, B₂)

⇒ SYM_Equal(SYM_Expr_Def(def_1)SYM_Expr_Def(def_2))

Property (1) indicates that if two symbolic expressions are hashed the resulting value numbers will be equal only if the two expressions may symbolically refer to the same abstract memory location. Property (2) indicates that two symbolic expressions, perhaps in different basic blocks, are definitions of the same abstract memory location if they hash to the same value number in both basic blocks. Property (3) says that two definitions will map to the same value number if the definition numbers were obtained using the same symbolic expression in different basic blocks. Thus, the hash function is applied to provide an answer to whether two symbolic expressions in the intermediate language representation are equivalent and the equivalency function is applied to determine whether two symbolic expression are ever equal.

The compiler using this method need not know exactly whether only two locations are equal, but instead only if they are symbolically equal. This method consequently allows abstract analysis of program points resulting in an optimization framework that can cleanly incorporate a large amount of interprocedural information, and thus constitutes a major advancement over the state of the art. However, not all embodiments must necessarily employ such a symbolic mapping and other mapping functions known in the art may instead be used. Alternative mapping techniques are found in John R. Ellis, "Bulldog: A Compiler for VLIW Architectures," (The MIT press 1986); and Mohammad R. Haghighat, "Symbolic Analysis for Parallelizing Compilers," (Kluwer Academic Publishers 1995).

One particular embodiment of the invention removes previously inserted phi-nodes during the coloring out phase. As is well known in the art, phi-nodes are artificial constructs used only during the compilation process and must be removed before machine readable object code is generated from the otherwise final intermediate language representation. The specific embodiment of FIG. 1 handles the task in any suitable manner known to the art, but one particular alternative embodiments handle this during coloring out. Thus, the final intermediate language representation, using previous examples, would be:

$t_1 = x + y$ if (p) then $\{t_2 = A[t_1]\}$

•

•

• else $\{t_5 = A[t_1]\}$

•

•

•

-continued $t_4 = A[t_1]$

This embodiment consequently frees additional registers during coloring out and removes the necessity for post-coloring out removal of phi-nodes.

Figure 5:
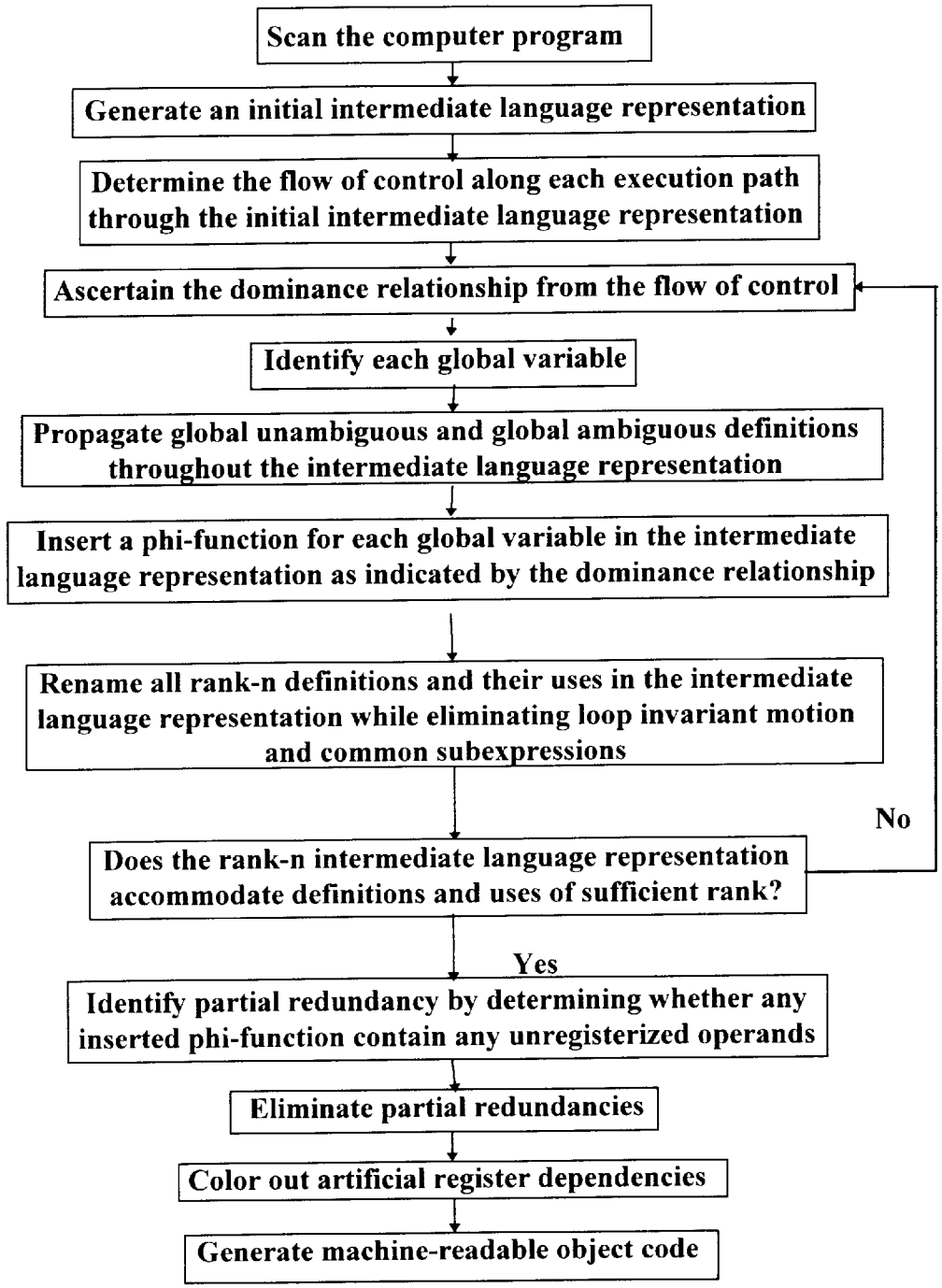
FIG. 5 diagrams a particular embodiment of the invention illustrated in FIG. 1 combining many of the alternative embodiments thereof as disclosed herein.

As those skilled in the art will readily recognize, many of the above can be combined in a variety of ways to obtain still other alternative embodiments. One such embodiment incorporating all the various alternative embodiments is illustrated in FIG. 5. The embodiment of FIG. 5 is discussed more fully in my application Ser. No. 08/829,933, entitled "A Method for Identifying Partial Redundancies in a New Processor Architecture."

Still other alternative embodiments are possible or even desirable. Alternative embodiments may include, for instance:

(1) identifying and eliminating partial redundancies while constructing the final intermediate language representation such as, for example, is set forth in my co-pending U.S. patent application Ser. No. 08/829,847, entitled "A Method for Identifying Partial Redundancies in Existing Processor Architectures" and in my co-pending U.S. patent application Ser. No. 08/829,933, entitled "A Method for Identifying Partial Redundancies in a New Processor Architecture;"

(2) eliminating loop invariant motion such as, for example, is set forth in my co-pending U.S. patent application Ser. No. 08/829,980, filed herewith, entitled "A Method for Optimizing a Loop in a Computer Program by Removing Loop-Invariant Loads Outside of a Loop;"

(3) identifying and eliminating common subexpressions such as, for example, is set forth in my co-pending U.S. patent application Ser. No. 08/829,856, entitled "A Method for Performing Common Subexpression Elimination on a Rank-n Static Single Assignment Language;" and (4) propagating ambiguous definitions such as, for example, is set forth in my co-pending U.S. patent application Ser. No. 08/831,159, entitled "A Method for Determining the Set of Variables that May Be Ambiguously Defined at a Point in a Computer Program."

Each of these applications was previously incorporated by reference. Indeed, one alternative embodiment of the present invention incorporates all the variations discussed above as set forth in FIG. 5.

Any of the foregoing methods may be implemented by programming a suitable general purpose computer. The programming may be accomplished through the use of a program storage device readable by the general purpose computer and encoding a program of statements executable by the computer for performing the operations described above. The program storage device may take the form of, e.g., one or more floppy disks, a hard disk, a CD ROM or other optical or magnetic-optical disk, a magnetic tape, a read-only memory chip (ROM), and other kinds of storage devices. The program of statements may be source code or object code, or a high-level language, or in some intermediate form such as a partially compiled code. The precise forms of the program storage device and of the encoding of statements are immaterial.

It will be appreciated by those of ordinary skill in the art relevant hereto having the benefit of this disclosure that the illustrative embodiments described above are capable of numerous variations without departing from the scope and spirit of the invention. While the particular embodiments disclosed above are presented utilizing C pseudo code, they are not limited to C. The invention may be applied to any computer program such as C++, FORTRAN, COBOL, PASCAL, etc. Furthermore, the methods may be performed on a computer program written or stored in object code or machine language as well as source code. Still further, the methods may be performed on a computer program stored in an intermediate compiler language that may be utilized to perform other optimizations prior to translation to object code. In addition, while the sequence of acts are presented in a specific order, the order may be modified unless otherwise indicated.

Accordingly, the exclusive rights sought herein are as described in the claims below.

What is claimed is:

1. A method of using static single assignment to color out artificial register dependencies while compiling at least a portion of a computer program, the method comprising:

creating a rank-n SSA intermediate language representation of the computer program, wherein n is a positive integer greater than 0, to assign a unique name to each symbolic expression;

mapping the symbolic expression into a table;

determining from the table which renamed elements from the intermediate language expression have symbolic expressions that are equivalent, by utilizing a hash function; and coloring out an artificial register dependency based on equivalent symbolic expressions.

2. The method of claim 1, wherein creating a rank-n SSA intermediate language representation further comprises:

(a) searching the rank-(n-1) static single assignment intermediate language for a rank-n definition that reaches at least one use; and (b) renaming the rank-n definition and the at least one use.

3. The method of claim 2 further comprising:

(c) repeating acts (a) and (b) until all rank-n definitions that reach at least one use are renamed.

4. The method of claim 2, wherein the rank-(n-1) static single assignment intermediate language includes a plurality of statement nodes and a plurality of expression nodes.

5. The method of claim 2, wherein searching the rank-(n-1) static single assignment intermediate language for a rank-n definition that reaches at least one use includes searching a rank-0 static single assignment intermediate language for a rank-1 definition that reaches at least one use.

6. The method of claim 2, wherein searching the rank-(n-1) static single assignment intermediate language for a rank-n definition that reaches at least one use includes searching a rank-1 static single assignment intermediate language for a rank-1 definition that reaches at least one use.

7. The method of claim 1, wherein creating a rank-n SSA intermediate language representation further comprises:

(a) searching the rank-(n-1) static single assignment intermediate language for a rank-n definition that reaches at least one use;

(b) renaming the rank-n definition and the at least one use, and (c) repeating acts (a) and (b) until all rank-1 definitions that reach at least one use are renamed; and wherein:

(d) the rank-(n-1) static single assignment intermediate language includes a plurality of statement nodes and a plurality of expression nodes; and (e) searching the rank-(n-1) static single assignment intermediate language for a rank-n definition that reaches at least one use includes searching a rank-0 static single assignment intermediate language for a rank-1 definition that reaches at least one use.

8. The method of claim 1, wherein the determination of whether two symbolic expressions are equivalent further includes utilizing a definition function and an equivalency function.

9. The method of claim 8, wherein the hash function retrieves a value number for any given symbolic expression.

10. The method of claim 8, wherein the definition function returns a definition number for any given expression.

11. The method of claim 8, wherein the equivalency function indicates whether any two symbolic expressions are equal.

12. A program storage device readable by a general purpose computer, the program storage device encoding statements for a method of using static single assignment to color out artificial register dependencies while compiling at least a portion of a computer program, the method comprising:

creating a rank-n SSA intermediate language representation of the computer program, wherein n is a positive integer greater than 0, to assign a unique name to each symbolic expression;

mapping the symbolic expression into a table;

determining from the table which renamed elements from the intermediate language expression have symbolic expressions that are equivalent, by utilizing a hash function; and coloring out an artificial register dependency based on equivalent symbolic expressions.

13. The device of claim 12, wherein creating a rank-n SSA intermediate language representation further comprises:

(a) searching the rank-(n-1) static single assignment intermediate language for a rank-n definition that reaches at least one use; and (b) renaming the rank-n definition and the at least one use.

14. The device of claim 13, further comprising:

(c) repeating acts (a) and (b) until all rank-n definitions that reach at least one use are renamed.

15. The device of claim 13, wherein the rank-(n-1) static single assignment intermediate language includes a plurality of statement nodes and a plurality of expression nodes.

16. The device of claim 13, wherein searching the rank-(n-1) static single assignment intermediate language for a rank-n definition that reaches at least one use includes searching a rank-0 static single assignment intermediate language for a rank-1 definition that reaches at least one use.

17. The device of claim 13, wherein searching the rank-(n-1) static single assignment intermediate language for a rank-n definition that reaches at least one use includes searching a rank-1 static single assignment intermediate language for a rank-1 definition that reaches at least one use.

18. The device of claim 12, wherein creating a rank-n SSA intermediate language representation further comprises:

(a) searching the rank-(n-1) static single assignment intermediate language for a rank-n definition that reaches at least one use;

(b) renaming the rank-n definition and the at least one use, and (c) repeating acts (a) and (b) until all rank-1 definitions that reach at least one use are renamed; and wherein:

(d) the rank-(n-1) static single assignment intermediate language includes a plurality of statement nodes and a plurality of expression nodes; and (e) searching the rank-(n-1) static single assignment intermediate language for a rank-n definition that reaches at least one use includes searching a rank-0 static single assignment intermediate language for a rank-1 definition that reaches at least one use.

19. The device of claim 12, wherein the determination of whether two symbolic expressions are equivalent further includes utilizing a definition function and an equivalency function.

20. The device of claim 19, wherein the hash function retrieves a value number for any given symbolic expression.

21. The device of claim 19, wherein the definition function returns a definition number for any given expression.

22. The device of claim 19, wherein the equivalency function indicates whether any two symbolic expressions are equal.

* * * * *